(12) United States Patent
Takahashi

(10) Patent No.: US 9,463,512 B2
(45) Date of Patent: Oct. 11, 2016

(54) MACHINE TOOL AND MACHINING METHOD

(75) Inventor: Hikaru Takahashi, Komoro (JP)

(73) Assignees: Citizen Holdings Co., Ltd., Nishitokyo-shi, Tokyo (JP); Citizen Machinery Co., Ltd., Kitasaku-gun, Nagano (JP)

( * ) Notice: Subject to any disclaimer, the term of this patent is extended or adjusted under 35 U.S.C. 154(b) by 206 days.

(21) Appl. No.: 14/241,698

(22) PCT Filed: Aug. 29, 2012

(86) PCT No.: PCT/JP2012/071810
§ 371 (c)(1),
(2), (4) Date: Feb. 27, 2014

(87) PCT Pub. No.: WO2013/031818
PCT Pub. Date: Mar. 7, 2013

(65) Prior Publication Data
US 2014/0202294 A1  Jul. 24, 2014

(30) Foreign Application Priority Data

Aug. 31, 2011 (JP) .................................. 2011-188563

(51) Int. Cl.
*B23B 7/00* (2006.01)
*B23B 13/12* (2006.01)
(Continued)

(52) U.S. Cl.
CPC ............... *B23B 13/126* (2013.01); *B23B 5/18* (2013.01); *B23B 7/06* (2013.01); *B23B 25/00* (2013.01);
(Continued)

(58) Field of Classification Search
CPC ..... Y10T 82/10; Y10T 82/14; Y10T 82/148; Y10T 82/2593; Y10T 82/27; Y10T 82/19; Y10T 82/192; Y10T 82/195; Y10T 82/198; B32B 1/00; B32B 3/26; B32B 13/126; B32B 2265/12; B32B 25/00; B32B 5/18; B32B 7/06; B32B 5/36; B32B 2270/34; B32B 41/06; B23Q 1/76; B23Q 1/763

USPC ........ 82/1.11, 162, 11, 12, 18, 19, 106–109, 82/164, 150–151, 170
See application file for complete search history.

(56) References Cited

U.S. PATENT DOCUMENTS

| 803,116 A | 10/1905 | Lewis |
| 2,290,341 A * | 7/1942 | Levitt .................... B23Q 27/00 279/6 |

(Continued)

FOREIGN PATENT DOCUMENTS

| CH | 232685 A | 6/1944 |
| DE | 110247 C | 5/1898 |

(Continued)

OTHER PUBLICATIONS

Office Action dated Nov. 3, 2014, issued for the corresponding Korean Patent Application No. 10-2013-7034048.

(Continued)

*Primary Examiner* — Sunil K Singh
*Assistant Examiner* — Nicole N Ramos
(74) *Attorney, Agent, or Firm* — Locke Lord LLP

(57) ABSTRACT

A machine tool includes a main spindle (10) which holds a workpiece (200, object to be machined) and is rotatable about the shaft center (C1), a main spindle motor (20, main spindle driver) which rotates the main spindle (10), a rotary guide bush (30, eccentric guide bush) which supports the workpiece (200) projecting from a leading end of the main spindle (10) to be rotatable in a state of being eccentric relative to the shaft center (C1) by a length E, a guide bush servomotor (40, guide bush driver) which rotates the rotary guide bush (30) about the shaft center (C1) in synchronization with the main spindle (10), and a controller (50) which controls the rotation and driving of the guide bush servomotor (40), so as to selectively switch between the rotation state and the stop state of the rotation.

4 Claims, 8 Drawing Sheets

(51) Int. Cl.
   *B23B 5/18* (2006.01)
   *B23B 7/06* (2006.01)
   *B23B 25/00* (2006.01)
   *B23Q 1/76* (2006.01)
   *B23B 1/00* (2006.01)

(52) U.S. Cl.
   CPC ................ *B23Q 1/763* (2013.01); *B23B 1/00* (2013.01); *B23B 2265/12* (2013.01); *G05B 2219/49313* (2013.01); *Y10T 82/10* (2015.01); *Y10T 82/13* (2015.01); *Y10T 82/19* (2015.01); *Y10T 82/2597* (2015.01)

(56) References Cited

U.S. PATENT DOCUMENTS

| | | | | |
|---|---|---|---|---|
| 2,456,776 | A * | 12/1948 | Faust | B23B 31/201 192/142 A |
| 3,009,374 | A * | 11/1961 | Foreman | B23B 23/045 279/119 |
| 3,448,644 | A * | 6/1969 | Banning | B23B 23/04 82/150 |
| 4,538,945 | A * | 9/1985 | Godecke | B23Q 27/006 29/57 |
| 5,275,072 | A * | 1/1994 | Schmid | B23B 31/16004 82/106 |
| 5,544,556 | A * | 8/1996 | Jones | B23B 5/18 279/6 |
| 5,931,069 | A * | 8/1999 | Garnett | B23B 5/18 82/106 |
| 6,026,549 | A * | 2/2000 | Makino | B23Q 1/5468 29/27 R |
| 6,578,456 | B2 * | 6/2003 | Ragab | B23B 3/161 279/6 |

FOREIGN PATENT DOCUMENTS

| | | |
|---|---|---|
| JP | 61-35703 U | 3/1986 |
| JP | H10-138007 A | 5/1998 |
| JP | 2001-054802 A | 2/2001 |

OTHER PUBLICATIONS

Supplementary European Search Report mailed Mar. 26, 2015, issued for the European patent application No. 12826693.9.
International Search Report dated Sep. 25, 2012, issued for PCT/JP2012/071810.

* cited by examiner

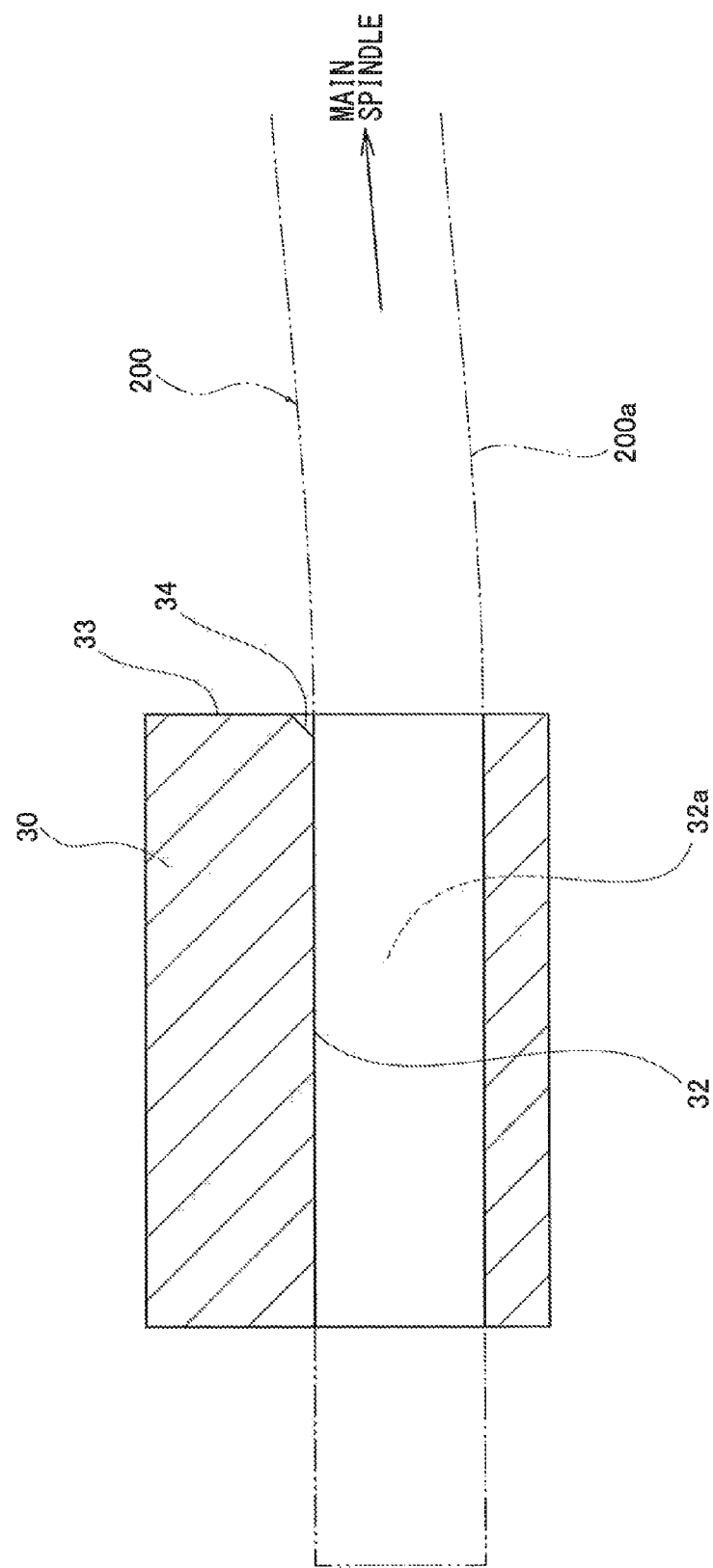

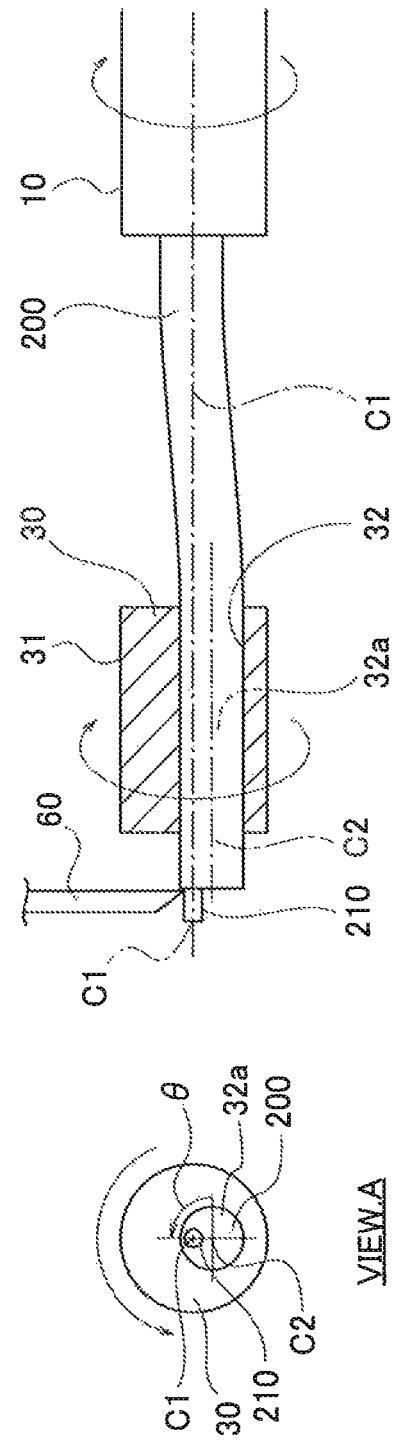

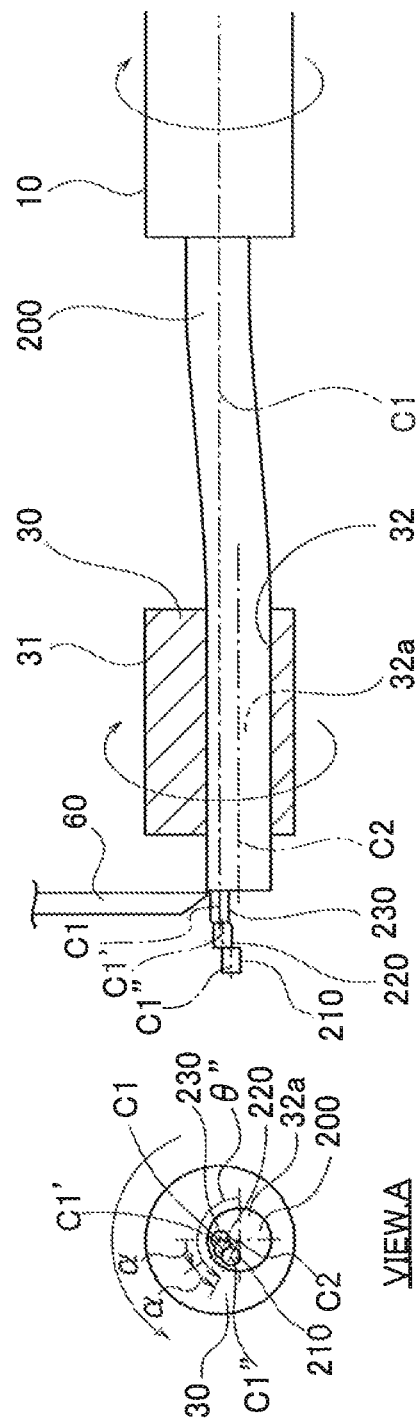

MACHINE TOOL AND MACHINING METHOD

CROSS REFERENCE TO RELATED APPLICATIONS

This application is a U.S. National Phase Application, pursuant to 35 U.S.C. §371, of PCT International Application Serial No. PCT/JP2012/071810, filed Aug. 29, 2012, designating the United States and published on Mar. 7, 2013 as publication WO 2013/031818 A1, which claims priority to Japanese Patent Application Serial No.: JP 2011-188563, filed Aug. 31, 2011, the entire contents of each of which are incorporated herein by reference in their entireties.

TECHNICAL FIELD

The present invention relates to a machine tool and a machining method, in particular, to an improvement in a machine tool including an eccentric guide bush.

DESCRIPTION OF THE RELATED ART

A machine tool, such as a lathe, is conventionally configured to hold an object to be machined (hereinafter referred to as a workpiece), such as a round bar, by a main spindle, and to machine the object to be machined projecting from the leading end of the main spindle with a tool while rotating the workpiece.

There is also a machine tool including a guide bush which always maintains a distance between a workpiece and a tool with high accuracy by supporting the workpiece proximal to the tool, and reliably controls the deflection of the workpiece (Patent Document 1).

It is necessary to shift the shaft center of the workpiece from the rotation center, namely, the shaft center of the main spindle when machining a part of the workpiece so as to have an eccentric shape in the radial direction of the workpiece.

In this case, for example, a chucking device (fastener) which fastens the workpiece to the main spindle is operated, and the shaft center of the workpiece is offset relative to the shaft center of the main spindle by a predetermined amount (Patent Document 2).

RELATED ART DOCUMENT

Patent Document

Patent Document 1: Japanese Patent Application Publication No. H10-138007
Patent Document 2: Japanese Utility Model Application Publication No. S59-12509 (Japanese Utility Model Application No. S57-107933).

SUMMARY OF THE INVENTION

Problem to be Solved by the Invention

However, the operation of the above-described chucking device during machining of the eccentric shape is complex, resulting in the entire machining time being increased.

The present invention has been made in view of the above circumstances, and an object of the present invention is to provide a machine tool which can simply perform an operation for machining an eccentric shape.

Means for Solving Problem

A machine tool and a machining method according to the present invention are provided to simplify operations during eccentric machining by using an eccentric guide bush which supports an object to be machined projecting from a leading end of a main spindle in a state of being eccentric relative to a shaft center of the main spindle.

Namely, the machine tool according to the present invention includes an eccentric guide bush which supports the object to be machined projecting from the leading end of the main spindle in a state of being eccentric relative to a shaft center of the main spindle.

Moreover, it is preferable that the eccentric guide bush be switched between a rotation state rotating about the shaft center of the main spindle and a stop state.

Furthermore, it is preferable that the rotation of the eccentric guide bush and the rotation of the main spindle be adjusted, so as to change a phase of the object to be machined in a portion of the eccentric guide bush, which eccentrically supports the object to be machined.

A machining method according to the present invention include rotating a main spindle about a shaft center, and machining an object to be machined by using an eccentric guide bush which supports the object to be machined projecting from a leading end of the main spindle in a state of being eccentric relative to a shaft center of the main spindle.

Moreover, it is preferable that the machining method further includes switching the eccentric guide bush between a rotation state rotating about the shaft center of the main spindle and a stop state.

Furthermore, it is preferable that the machining method include adjusting the rotation of the electric guide bush and the rotation of the main spindle, so as to change a phase of the object to be measured in a portion of the eccentric guide bush, which eccentrically supports the object to be measured.

Effect of the Invention

According to the machine tool and the machining method of the present invention, the operations during the eccentric machining can be simply performed.

BRIEF DESCRIPTION OF THE DRAWINGS

FIG. 4 is a view illustrating the rotary guide bush including a chamfered edge.

FIG. 7A is a view corresponding to FIGS. 2A to 3B illustrating a change in the phase of the workpiece in the hole of the rotary guide bush, and illustrating a first machined portion.

FIG. 7C is a view corresponding to FIGS. 2A to 3B illustrating a change in the phase of the workpiece in the hole of the rotary guide bush, and illustrating the first machined portion, the second machined portion, and a third machined portion.

DESCRIPTION OF EMBODIMENT

Hereinafter, an embodiment of a machine tool and a machining method according to the present invention will be described with reference to the drawings.

(Configuration)

Figure 1:
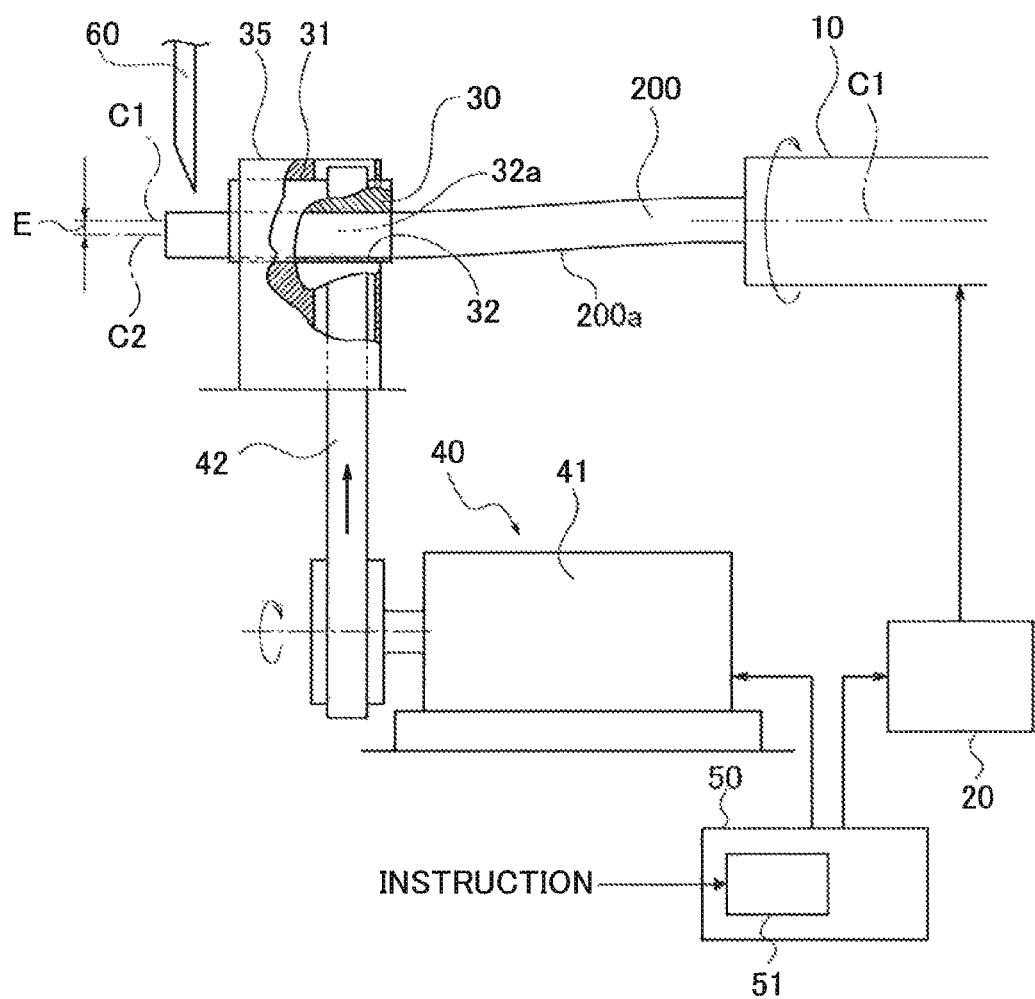
FIG. 1 is a view illustrating a main section of an automatic lathe in a detailed embodiment of a machine tool according to the present invention.

FIG. 1 is a view illustrating a main section of an automatic lathe as one embodiment of a machine tool according to the present invention, and a partial cross-sectional view of an after-described rotary guide bush 30 (eccentric guide bush) based on the brake line.

This automatic lathe includes a main spindle 10 which holds a workpiece (object to be machined) 200, and is rotatable about a shaft center C1, a main spindle motor 20 (main spindle driver) which rotates the main spindle 10 about the shaft center C1, a rotary guide bush 30 which rotatably supports the workpiece 200 projecting from the leading end of the main spindle 10 in a state which is eccentric relative to the shaft center C1 of the main spindle 10 in the radial direction by a length E, a guide bush servomotor 40 (guide bush driver) which rotates the rotary guide bush 30 about the shaft center C1 of the main spindle 10, a controller 50 which controls the driving of the guide bush servomotor 40, so as to selectively switch between a rotation state in which the rotary guide bush 30 rotates together with the main spindle 10 and a stop state in which the rotation of these is stopped, and a tool 60 such as a blade Which is disposed near the rotary guide bush 30, and machines the workpiece 200 projecting from the rotary guide bush 30.

The workpiece 200 is made of a material which deflects corresponding to at least an after-described eccentric amount E within a distance range from the leading end of the main spindle 10 to the rotary guide bush 30.

The main spindle 10 includes a chucking device (not shown) such as a collet chuck for fastening the workpiece 200 such that the center of the workpiece 200 is aligned with the shaft center C1. The workpiece 200 is held in the main spindle 10 by a workpiece fastener.

The controller 50 includes an input section 51 to which an instruction switching the above-described rotation state and stop state is input. The controller 50 controls the driving of the guide bush servomotor 40 according to the rotation instruction or the stop instruction input to the input section 51 by a user who operates the automatic lathe.

In particular, upon the input of the rotation instruction to the input section 51, the controller 50 drives the guide bush servomotor 40 so as to rotate the rotary guide bush 30 about the shaft center C1 of the main spindle 10 in synchronization with the main spindle 10. On the other hand, upon the input of the stop instruction to the input section 51, the controller 50 stops the driving of the guide bush servomotor 40 so as to stop the rotary guide bush 30.

The controller 50 controls the driving of the main spindle motor 20, but such control is a known general control.

The controller 50 controls the guide bush servomotor 40 so as to rotate in synchronization with the rotation of the main spindle motor 20 with reference to the control processing which rotates and drives the main spindle motor 20.

Synchronized rotation refers to rotation such that the rotation angle speed of the guide bush servomotor 40 conforms to the rotation angle speed of the main spindle motor 20. Therefore, the guide bush servomotor 40 does not differ from the main spindle motor 20 in phase during the rotation.

The rotary guide bush 30 has an approximate cylindrical shape, and an outer circumferential surface 31 of the rotary guide bush 30 is rotatably held in a casing 35 such that the center of the outer circumferential surface 31 of the cylindrical shape is disposed in a position aligned with the shaft center C1 of the main spindle 10.

On the other hand, the center C2 of the inner circumferential surface 32 of the rotary guide bush 30 is arranged in a position which is eccentric relative to the shaft center C1 of the main spindle 10 by the above-described eccentric amount E.

The inner circumferential surface 32 is the outer edge of a hole 32a (portion eccentrically supporting workpiece). The hole 32a is formed to have a radius such that an outer circumferential surface 200a of the workpiece loosely has contact with the hole 32a and penetrates through the hole 32a. The center of the workpiece 200 is approximately aligned with the center C2 of the inner circumferential surface 32 of the rotary guide bush 30. The workpiece 200 rotates relative to the rotary guide bush 30 between, the outer circumferential surface 200a of the workpiece 200 and the inner circumferential surface 32 of the rotary guide bush 30.

The guide bush servomotor 40 includes a motor main body 41 and a belt 42 which transfers the rotation driving force generated by the motor main body 41 to the outer circumferential surface 31 of the rotary guide bush 30. The rotary guide bush 30 in which the rotation driving force is transferred to the outer circumferential surface 31 by the belt 42 rotates about the center of the outer circumferential surface 31 (shaft center C1 of main spindle 10) in synchronization with the main spindle 10.

The eccentric amount E of the rotary guide bush 30 is a length shorter than the radius of the workpiece 200.

(Function and Effect)

Next, the functions and effects of the automatic lathe of the present embodiment will be described.

In addition, the functions of the automatic lathe are one embodiment of the machining method according to the present invention.

At first, when performing eccentric machining which is eccentric relative to the center of the workpiece 200 by the eccentric amount E in a state in which the workpiece 200 is set in the automatic lathe as illustrated in FIG. 1, the rotation instruction corresponding to the performance of the eccentric machining is input to the input section 51 by a user.

The controller 50 controls the main spindle motor 20 so as to rotate the main spindle 10 about the shaft center C1 at a predetermined rotation angle speed, and controls the guide bush servomotor 40 so as to rotate the rotary guide bush 30 about the center of the outer circumferential surface 31 of the rotary guide bush 30 in the same direction and at the same rotation angle speed as those of the main spindle 10.

Figure 2A:
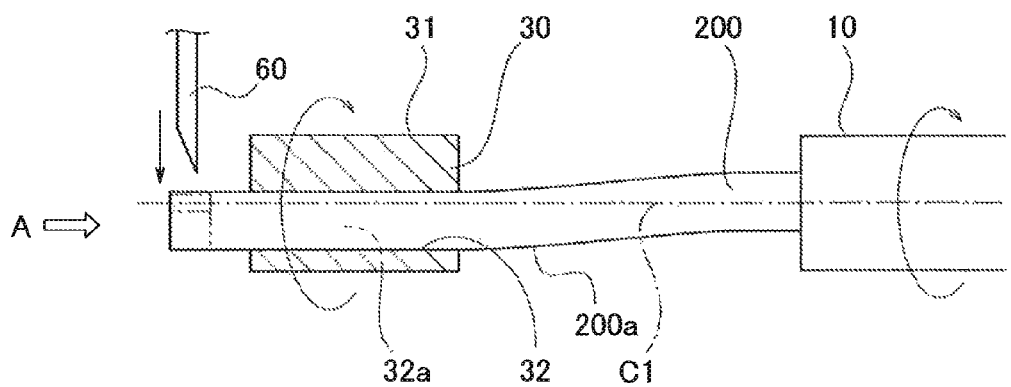
FIG. 2A is a view illustrating a switching state during eccentric machining (rotating rotary guide bush), and is a side view corresponding to FIG. 1 (cross-sectional rotary guide bush).
Figure 2B:
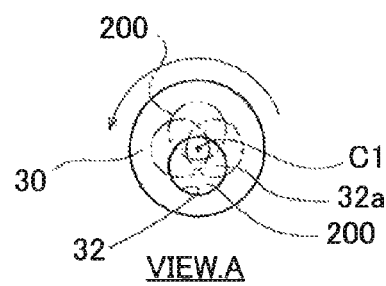
FIG. 2B is a view illustrating the switching state during eccentric machining (rotating a rotary guide bush) based on the arrow A in FIG. 2A.

The main spindle 10 thereby rotates about the shaft center C1 at a predetermined rotation angle speed, and the rotary guide bush 30 rotates about the center of the outer circumferential surface 31 in the same direction and at the same rotation angle speed as those of the main spindle 10 as illustrated in FIGS. 2A, 2B.

In this case, the inner circumferential surface 32 of the rotary guide bush 30 rotates about the shaft center C1 of the main spindle 10 as illustrated in FIG. 2B.

On the other hand, the workpiece 200 rotates integrally with the main spindle 10, so that the workpiece 200 rotates in the same direction and at the same rotation angle speed as those of the main spindle 10.

As a result, there is no relative rotation, namely, there is no phase difference between the inner circumferential surface 32 of the rotary guide bush 30 and the outer circumferential surface 200a of the workpiece 200 supported in the hole 32a to penetrate therethrough. Thus, the workpiece 200 rotates about the shaft center C1 of the main spindle 10 as illustrated in FIG. 2B.

In this state, the tool 60 is pressed to the workpiece 200, so that the workpiece 200 is machined into a shape (cross-sectional circular shape with shaft center C1 as center as illustrated by two-dot chain line in FIGS. 2A, 2B) which is eccentric relative to the center of the workpiece 200 by the eccentric amount E.

On the other hand, when machining a shape (cross-sectional circular shape with center of workpiece 200 as center) which is not eccentric relative to the center of the workpiece 200, the stop instruction corresponding to the execution of the non-eccentric machining is input to the input section 51 by a user or the like.

The controller 50 controls the main spindle motor 20 so as to rotate the main spindle 10 about the shaft center C1 at a predetermined rotation angle speed, and stops the guide bush servomotor 40 so as to stop the rotary guide bush 30 without rotating the rotary guide bush 30 in accordance with the stop instruction input to the input section 51.

Figure 3A:
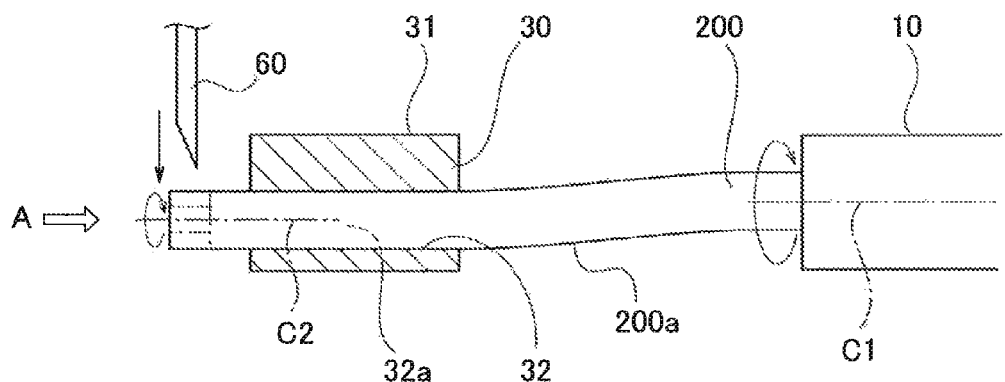
FIG. 3A is a view illustrating the switching state during normal machining (stopping rotary guide bush), and is a side view corresponding to FIG. 1 (cross-sectional rotary guide hush).

The rotary guide bush 30 is thereby maintained in the stop state illustrated in FIGS. 3A. 3B, but the workpiece 200 rotates integrally with the main spindle 10 in the same direction arid at the same rotation angle speed as those of the main spindle 10.

As a result, the workpiece 200 only rotates in the hole 32a of the non-rotating rotary guide bush 30 at the same rotation angle speed as that of the main spindle 10.

Figure 3B:
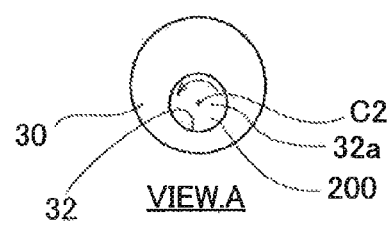
FIG. 3B is a view illustrating the switching state switched during normal machining (stopping rotary guide bush) based on the arrow A in FIG. 3A.

More specifically, the workpiece 200 rotates about the center C2 of the hole 32a of the rotary guide bush 30 as illustrated in FIG. 3B.

In this state, the tool 60 is pressed to the workpiece 200, so that the workpiece 200 is machined into a shape (illustrated by two-dot chain line in FIGS. 3A, 3B) which is not eccentric relative to the center of the workpiece 200.

As described above, according to the automatic lathe of the present embodiment, during the eccentric machining of the workpiece 200, it is unnecessary to exchange the chucking device provided in the main spindle 10 for a device for eccentric machining, so that an operation required for the exchanging can be omitted; thus, an increase in a machining time due to the exchanging of the chucking device can be prevented.

According to the automatic lathe of the present embodiment, it is unnecessary to exchange the chucking device of the main spindle 10 between the eccentric machining of the workpiece 200 and the normal machining (machining into shape with center of workpiece 200 as center) which is not the eccentric machining, and it is unnecessary to exchange the guide bush which supports the workpiece 200 proximal to the tool 60 between the eccentric rotary guide bush 30 and the general guide bush which is not eccentric.

Therefore, it becomes unnecessary to take time for the exchanging operation of the guide bush or the exchanging operation of the chucking device in switching between the eccentric machining and the normal machining. Thus, the total machining time by the automatic lathe can be reduced.

The eccentric machining and the normal machining can be switched with a simple operation which switches the guide bush servomotor 40 between rotation and stop. The operation performance can be therefore improved.

In addition, the present embodiment is an example which is applied to the automatic lathe. However, the machine tool according to the present invention is not limited to this embodiment, and can be a manual lathe or another machine tool as long as it performs the eccentric machining and the normal machining by rotation.

Moreover, as illustrated in FIG. 4, in the automatic lathe of the present embodiment, it is preferable to chamfer a corner portion 34 adjacent to the inner circumferential surface 32 in the end face 33 facing the main spindle 10 in the end faces of the rotary guide bush 30 as illustrated in FIG. 4.

The rotary guide bush 30 supports the workpiece 200 in a state of being deflected by the amount corresponding to the eccentric amount E. For this reason, a relatively strong contact pressure acts on the corner portion 34 compared to the other portions.

In the present embodiment which may rotate only the workpiece 200 without rotating the rotary guide bush 30, the corner portion 34 and the workpiece 200 move relatively under a strong contact state. For this reason, a part of the workpiece 200 which has contact with the corner portion 34 (circular portion of workpiece 200 along circumferential direction because workpiece 200 rotates) may be scratched or surfer from wear.

On the other hand, by chamfering the corner portion 34, the above-described contact pressure can be reduced, so that the above-described generation of scratches or wear can be controlled.

In addition, it is not necessary to chamfer the entire circular portion in the corner portion 34, which is the intersection line with the inner circumferential surface 32 in the end surface 33. It is necessary to chamfer only a portion corresponding to the deflection direction of the workpiece 200, namely, a portion which has contact with the workpiece 200, with a strong contact pressure.

The chamfered shape is not limited to the cross-sectional linear shape (inclination shape in conical shape) illustrated in FIG. 4, and can be a shape along the shape of the outer circumferential surface 200a of the deflected workpiece 200.

When the chamfering is performed with the shape along the outer circumferential surface 200a of the workpiece 200, the chamfered surface has contact with the outer circumferential surface 200a of the workpiece 200 over a wide area, so that the contact with a specific portion is controlled, and the contact pressure can be further lowered.

In the above embodiment, the rotary guide bush 30 drives by the guide bush servomotor 40 which is provided separately from the rotary guide bush 30 and the belt 42 for transferring the rotation driving force. However, the machine tool and the machining method according to the present invention are not limited to the above embodiment. A so-called built-in motor in which a motor for driving the rotary guide bush 30 is integrally incorporated into the rotary guide bush 30 can be adopted as a guide bush driver.

A mechanism (transfer mechanism) for transferring the rotation driving force of the main spindle motor 20 to the rotary guide bush 30 can be provided instead of providing the guide bush servomotor 40 dedicated for driving the rotary guide bush 30. A clutch mechanism selectively switching the connection state which transfers the rotation driving force of the main spindle motor 20 to the rotary guide bush 30 and the disconnection connection which does not transfer the rotation driving force can be introduced in a part of the mechanism.

In this case, the main spindle motor 20 and the transfer mechanism including the clutch mechanism operate as the guide bush driver.

In the above-described embodiment, an instruction is input to the input section 51 of the controller 50 by a user or the like. However, such an instruction is not only a manually-input instruction, but also an instruction recorded as a part of a machining program.

Namely, in a numerical control (NC) machine such as an automatic lathe of a machine tool, the machining operation is controlled by a machining program. With this configuration, the rotary guide bush 30 rotates or stops in accordance with an instruction of such a machining program.

More specifically, when stopping the rotation of the rotary guide bush 30 from the rotation state in synchronization with the rotation of the main spindle 10, an instruction which changes the synchronized rotation control state to the single control state of the rotary guide bush 30 is given, so that the rotary guide bush 30 is stopped in a predetermined rotation angle position, and the stopped position is held, so as to be in the stop state.

In the automatic lathe of the present embodiment, the state, which operates the rotary guide bush 30 as the eccentric guide bush so as to rotate about the shaft center C1 of the main spindle 10 in synchronization with the main spindle 10, and the state, which operates the rotary guide bush 30 as the fastened guide bush so as to rotate only the workpiece 200 without rotating the rotary guide bush 30 even if the main spindle 10 rotates, are switched. With this configuration, the eccentric machining and the center machining (non-eccentric machining) can be performed.

The tool 60 which machines the workpiece 200 is disposed relative to the workpiece 200 supported by the fastened guide bush, so as to linearly move toward the extended line of the shaft center C1 of the main spindle 10 from the outer circumferential surface 200a of the workpiece 200.

Figure 5A:
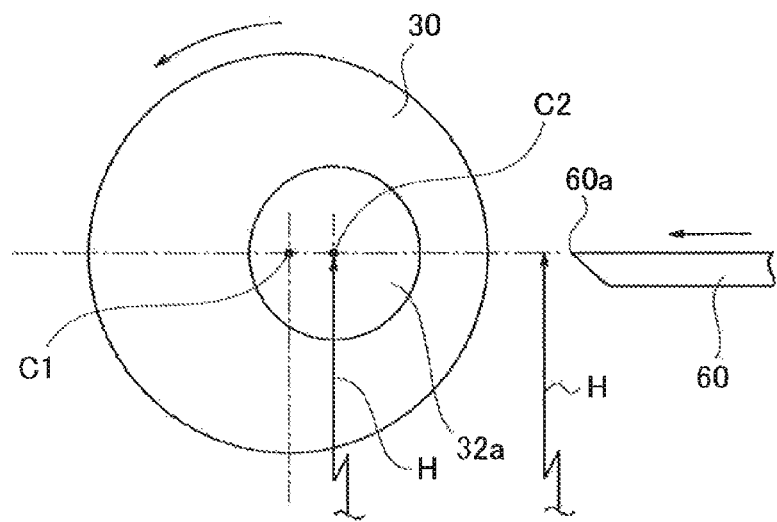
FIG. 5A is a view illustrating a positional relationship at the same height between the center of the workpiece and a blade edge of a tool (Part 1).
Figure 5B:
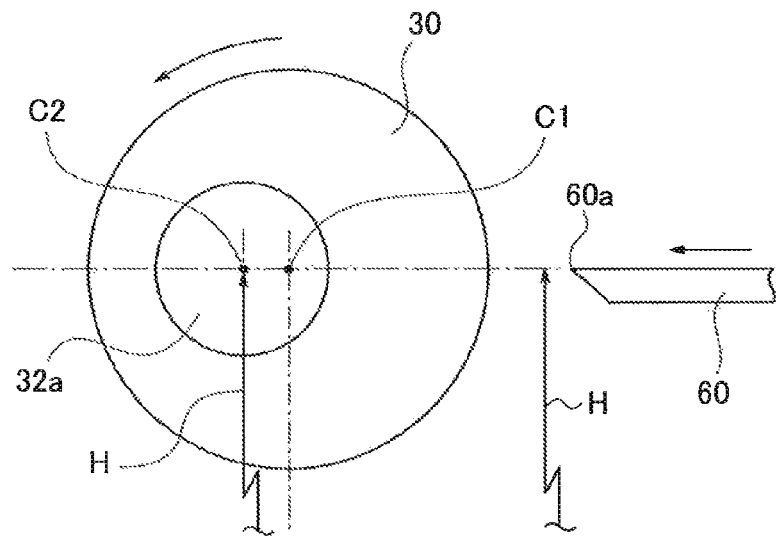
FIG. 5B is a view illustrating a positional relationship at the same height between the center of the workpiece and the blade edge of the tool (Part 2).
Figure 5C:
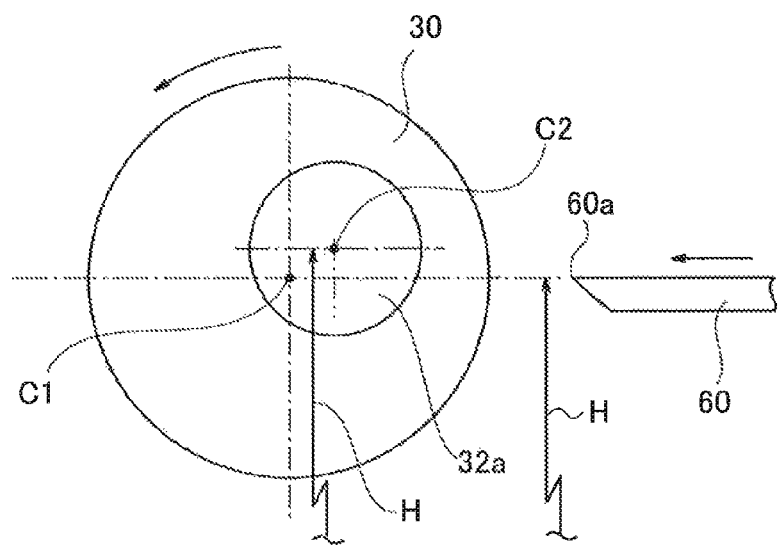
FIG. 5C is a view illustrating a positional relationship at a different height between the center of the workpiece and the blade edge of the tool.

Namely, as illustrated in FIGS. 5A, 5B, 5C, for example, a blade edge 60a of the tool 60 is disposed in the same horizontal plane as the shaft center C1, and is disposed to move in the normal line relative to the outer circumferential surface 200a of the workpiece 200. The height position H of the shaft center C1 of the main spindle 10 is aligned with the height position H of the blade edge 60a of the tool 60.

In the case of operating the rotary guide bush 30 as the fastened guide bush after operating the rotary guide bush 30 in the present embodiment as the eccentric guide bush, when the center C2 of the hole 32a of the rotary guide bush 30 is located on the line connecting the position of the shaft center C1 and the position of the blade edge 60a of the tool 60 as illustrated in FIGS. 5A, 5B at the end point where the rotary guide bush 30 operates as the eccentric guide bush, the height position H of the center of the workpiece 200 is aligned with the height position H of the blade edge 60a of the tool 60 when operating the rotary guide bush 30 as the fastened guide bush.

On the other hand, when the center C2 of the hole 32a of the rotary guide bush 30 is not located on the line connecting the position of the shaft center C1 and the position of the blade edge 60a of the tool 60 as illustrated in FIG. 5C at the end point where the rotary guide bush 30 operates as the eccentric guide bush, the height position H of the center of the workpiece 200 is not aligned with the height position H of the blade edge 60a of the tool 60 along the vertical direction.

When the height position H of the center of the workpiece 200 is not aligned with the height position H of the blade edge 60a of the tool 60, the feeding amount of the tool 60 toward the shaft center C1 does not conform to the amount of decrease in the radius of the workpiece 200, so that an intended size of the workpiece 200 after machining cannot be obtained.

When operating the rotary guide bush 30 in the present embodiment as the fastened guide bush, it is important that the height position H of the center of the workpiece 200 be aligned with the height position H of the blade edge 60a of the tool 60.

Consequently, in the automatic lathe of the present embodiment, in the case of operating the rotary guide bush 30 as the fastened guide bush, the controller 50 controls the driving of the guide bush servomotor 40 so as to always stop the rotary guide bush 30 in a predetermined position, or controls the driving of the guide bush servomotor 40 so as to correct the stop position to a predetermined position by detecting the stop position of the rotary guide bush 30 based on the workpiece 200 supported through the hole 32a in the stop state of the rotary guide bush 30.

In more detail, a specific configuration, which controls the driving of the guide bush servomotor 40 so as to always stop the rotary guide bush 30 in a predetermined position, allows the driving of the guide bush servomotor 40 to be controlled so as to stop the rotary guide bush 30 in the rotation position illustrated in FIG. 5A or in the rotation position illustrated in FIG. 5B where the height position H of the center C2 of the hole 32a is aligned with the height position H of the leading edge 60a of the tool 60. Such a configuration includes a rotation position detector such as a rotary encoder which detects the rotation position of the rotary guide bush 30, and a controller which controls the driving of the guide bush servomotor 40 so as to stop in the rotation position illustrated in FIG. 5A or FIG. 5B based on the rotation position detected by the rotation position detector.

In addition, the controller in this configuration can be the controller 50 having the above operations.

On the other hand, when the rotary guide bush 30 is not controlled at the time of stoppage, the above configuration includes a controller which controls the driving of the guide bush servomotor 40 so as to rotate the rotary guide bush 30 from the stop position to the rotation position as illustrated in FIG. 5A or the rotation position illustrated in FIG. 5B. The stop position of the rotary guide bush 30 is specified based on the position of the workpiece 200 supported through the hole 32a, which is detected by the contact of the blade edge 60a of the tool 60 to the outer circumference surface 200a of the workpiece 200 as a substitute for a pickup in the stop position unknown state.

Figure 6A:
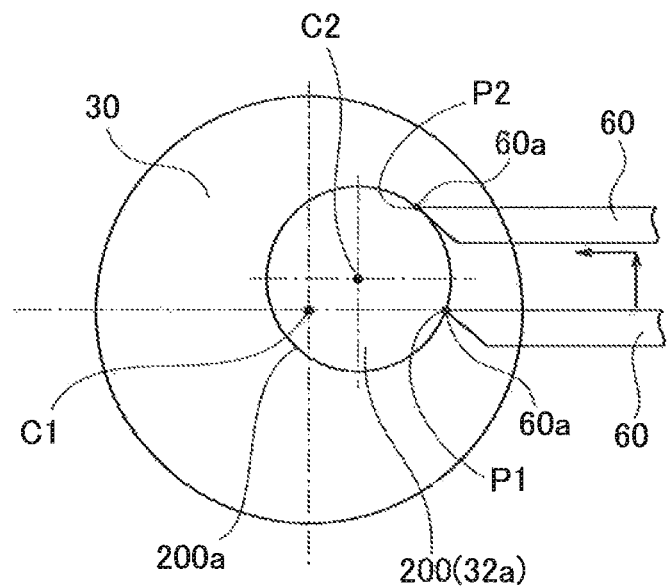
FIG. 6A is a view describing a procedure which specifies the rotation position (rotation angle position) of the rotary guide bush, and illustrating an arbitrary stop state.

More specifically, the blade edges 60a of the tool 60 have contact with different points P1, P2 in the outer circumferential surface 200a of the workpiece 200 as illustrated in FIG. 6A while the rotary guide bush 30 stops.

Each coordinate of the two points P1, P2 with which the blade edges 60a have contact is obtained from the displacement of the tool 60, and the obtained coordinates of the two points P1, P2 are input to the controller 50. The displacement of the tool 60 is also detected in the controller 50.

The controller 50 calculates the coordinate of the center of the workpiece 200, namely, the coordinate of the center C2 of the hole 32a based on the known radius R of the workpiece 200 and the input coordinates of the two points P1, P2.

Figure 6B:
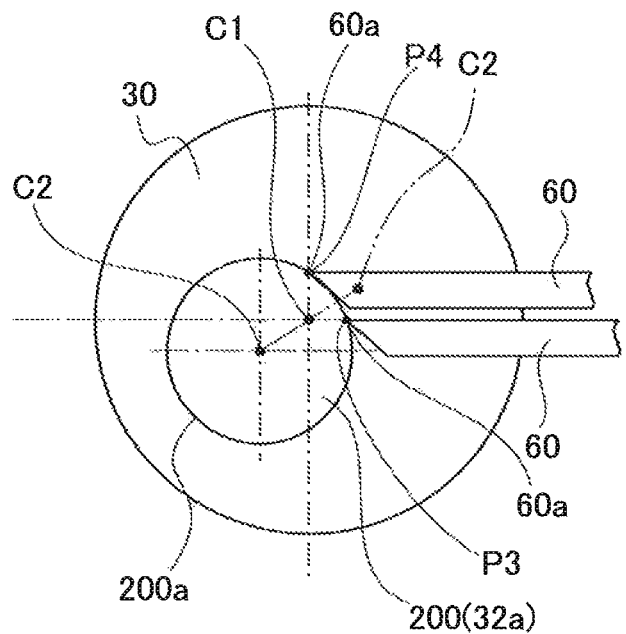
FIG. 6B is a view describing a procedure which specifies the rotation position (rotation angle position) of the rotary guide bush, and illustrating a state in which the rotary guide bush rotates at 180 degrees from the stop state in FIG. 6A, and is stopped.

Next, the controller 50 rotates the rotary guide bush 30 at 180 degrees, and stops the rotary guide bush 30 as illustrated in FIG. 6B.

Similar to the above, the blade edges 60a of the tools 60 have contact with two different points P3, P4 in the outer circumferential surface 200a of the workpiece 200, so as to obtain each coordinate of the two points P3, P4. The controller 50 calculates the coordinate of the center of the workpiece 200, namely, the coordinate of the center C2 of the hole 32a based on the coordinates of the two points P3, P4 and the known radius R of the workpiece 200.

The controller 50 calculates the middle point of the coordinate of the center C2 (FIG. 6A) of the hole 32a before the rotary guide bush 30 rotates at 180 degrees and the coordinate of the point C2 (FIG. 6B) of the hole 32a after the rotary guide bush 30 rotates as the coordinate of the shaft center C1. The controller 50 specifies the rotation position of the rotary guide bush 30 based on the coordinate of the shaft center C1 and the coordinate of the center C2 of the hole 32a before the rotary guide bush 30 rotates at 180 degrees.

The controller 50 controls the driving of the guide bush servomotor 40 so as to rotate the rotary guide bush 30 from the specified stop position to the rotation position illustrated in FIG. 5A or FIG. 5B.

With this configuration, in the automatic lathe of the present invention, the alignment of the height position H of the center C2 of the hole 32a of the rotary guide bush 30 and the height position H of the blade edge 60a of the tool 60 can be achieved.

(Modified Example)

The automatic lathe of the above-described embodiment is configured such that the controller 50 controls the guide bush servomotor 40 so as to rotate in synchronization with the main spindle motor 20 When rotating the guide bush servomotor 40. However, the machine tool according to the present invention is not limited to the above embodiment.

For example, in the following modified example, the controller 50 rotates at least one of the guide bush servomotor 40 and the main spindle motor 20 when rotating the guide bush servomotor 40, so as to shift the phase between the rotary guide bush 30 and the workpiece 200. After that, the controller 50 controls the guide bush servomotor 40 and the main spindle motor 20 so as to rotate in synchronization.

The controller 50 operates as a phase controller which changes the phase between the rotary guide bush 30 and the workpiece 200 by controlling the driving of the guide bush servomotor 40 and the main spindle motor 20 as described above.

More particularly, the controller 50 drives the guide bush servomotor 40 and the main spindle motor 20 to rotate in synchronization, so that a machined portion 210 which is eccentric to the center of the workpiece 200 is formed in the workpiece 200 supported through the hole 32a of the rotary guide bush 30 in a predetermined angle position about the center of the workpiece 200, namely, in a position at an angle θ relative to the horizontal plane passing through the center of the workpiece 200 as illustrated in FIG. 7A.

Next, the controller 50 stops both of the guide bush servomotor 40 and the main spindle motor 20. After that, as illustrated in FIG. 7B, the controller 50 only rotates the main spindle motor 20 at a predetermined angle a, so as to change the phase of the workpiece 200 about the center of the workpiece 200 in the hole 32a of the rotary guide bush 30 at an angle α, and stops the rotation of the main spindle motor 20 after the change in phase.

Figure 7B:
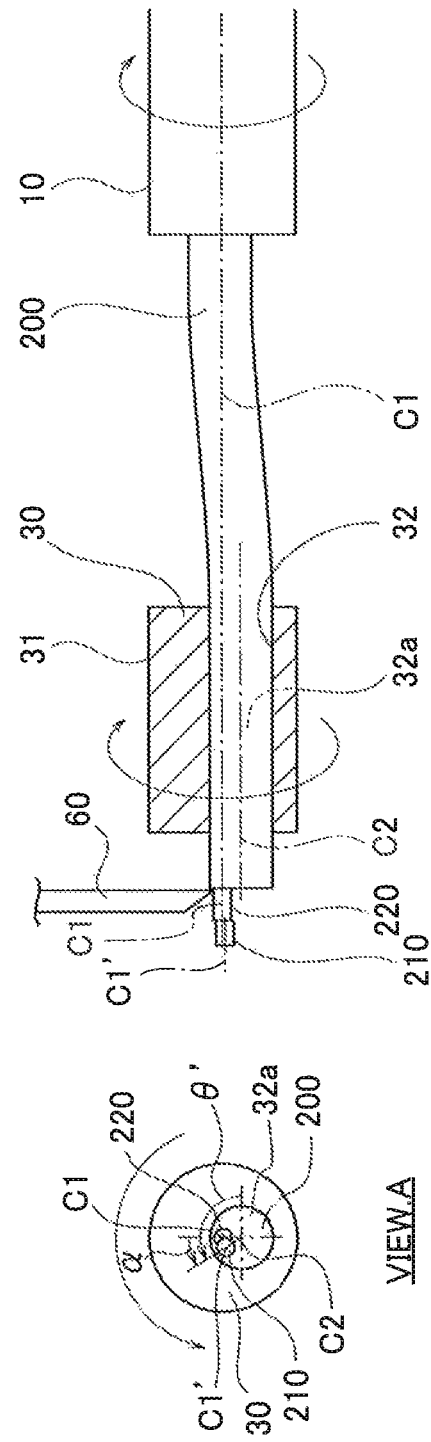
FIG. 7B is a view corresponding to FIGS. 2A to 3B illustrating a change in the phase of the workpiece in the hole of the rotary guide bush, and illustrating the first machined portion and a second machined portion.

Next, the controller 50 drives the guide bush servomotor 40 and the main spindle motor 20 to rotate in synchronization, so that a machined portion 220 which is eccentric to the center of the workpiece 200 is formed in the workpiece 200 supported through the hole 32a of the rotary guide bush 30 in a predetermined angle position about the center of the workpiece 200, namely, in a position at an angle θ relative to the horizontal plane passing through the center of the workpiece 200 as illustrated in FIG. 7B.

The machined portion 210 obtained by the first machining is shifted relative to the machined portion 220 at an angle a about the center of the workpiece 200 by the control of the change in phase with the controller 50. Namely, the machined portion 210 is eccentric in the position at an angle θ'(=θ+α) relative to the horizontal plane passing through the center of the workpiece 200.

Moreover, the controller 50 stops both of the guide bush servomotor 40 and the main spindle motor 20. After that, the controller 50 only rotates the main spindle motor 20 at a predetermined angle α, so that the phase about the center of the workpiece 200 in the hole 32a of the rotary guide bush 30 is changed at an angle α. After the phase is changed, the controller 50 stops the rotation of the main spindle motor 20.

Next, the controller 50 drives the guide bush servomotor 40 and the main spindle motor 20 so as to rotate in synchronization, so that a machined portion 230 which is eccentric to the center of the workpiece 200 is formed in the workpiece 200 supported through the hole 32a of the rotary guide bush 30 in the position at a predetermined angle θ about the center of the workpiece 200 as illustrated in FIG. 7C.

The machined portion 220 obtained by the second machining is shifted at an angle α about the center of the workpiece 200 relative to the machined portion 230 by the control of the phase with the controller 50. The machined portion 210 obtained by the first machining is shifted at an angle 2α about the center of the workpiece 200 relative to the machined portion 230. Namely, the machined portion 210 is eccentric in the position at an angle θ"(=θ2α) relative to the horizontal plane passing through the center of the workpiece 200, and the machined portion 220 is eccentric in the position at an angle θ'(=θ+α) to the horizontal plane passing through the center of the workpiece 200.

As described above, according to the automatic lathe of the modified example, with the combination of the rotary guide bush 30 rotating about the shaft center C1 of the main spindle 10 in synchronization with the main spindle 10 and the change in phase of the workpiece 200 in the hole 32a of the rotary guide bush 30, a plurality of machined portions 210, 220, 230 each having a different eccentric direction is simply formed by the single rotary guide bush 30.

This means that the eccentric amount among the machined portions of the workpiece 200 is not limited to the eccentric amount E of the rotary guide bush 30 by shifting the phase between the rotary guide bush 30 and the workpiece 200.

According to the automatic lathe of the modified example, the eccentric amount among the machined portions of the workpiece 200 can be set to twice the eccentric amount E of the rotary guide bush 30 by shifting the phase at 180 degrees.

According to the automatic lathe of the modified example, the eccentric amount among the machined portions of the workpiece 200 can be set to a range which falls below the eccentric amount E of the rotary guide bush 30 by shifting the phase within the range less than 60 degrees.

According to the automatic lathe of the modified example, machining corresponding to a plurality of the eccentric amounts can be performed with the single rotary guide bush 30.

Consequently, even if the eccentric amount of the machined portion 210 is smaller than a desired eccentric amount, the next machined portion 220 is machined by shifting the phase relative to the machined portion 210, so as to supply a deficient eccentric amount Δ. Therefore, the eccentric amount of the machined portion 210 with the machined portion 220 as a standard can be a desired eccentric amount.

Similarly, when the eccentric amount of the machined portion 210 is larger than a desired eccentric amount, the next machined portion 220 is machined by shifting the phase relative to the machined portion 210, so as to cut the excessive eccentric amount Δ. Therefore, the eccentric amount of the machined portion 210 with the machined portion 220 as a standard can be a desired eccentric amount.

In the automatic lathe of the modified example, the machined portions 210, 220, 230 each having a different phase can be formed by the combination of the control by the controller 50, which drives the guide bush servomotor 40 and the main spindle motor 20 so as to rotate in synchronization, and the control by the controller 50, which stops the guide bush servomotor 40 and rotates only the main spindle motor 20.

On the other hand, the controller 50 can control both of the motors 40, 20 so as to continuously change the phases of the guide bush servomotor 40 and the main spindle motor 20 without stopping the guide bush servomotor 40.

As described above, by driving both of the motors 40, 20 so as to continuously change the phases of both motors without stopping the guide bush servomotor 40, a spiral machined portion such as a coiled spring in which the phase between the machined portions continuously changes can be formed without forming the discontinuous machined portions 210, 220, 230 having the steps as illustrated in FIG. 7C. The workpiece 200 can be formed in a more complex solid shape by controlling the feeding amount of the workpiece 200 in the shaft C1 direction and the shift in the phase between both motors 40, 20.

The machine tool according to the present invention does not always necessarily need to be configured to selectively switch the rotary guide bush 30 to rotate together with the main spindle 10 and to stop the rotation as described in the above embodiment, as long as the machine tool has the rotary guide bush 30 which is rotatable together with the main spindle 10.

Therefore, in the automatic lathe of the modified example, when the controller 50 controls the guide bush servomotor 40 and the main spindle motor 20 so as to obtain the phase difference, the controller 50 can change the phase difference between the guide bush servomotor 40 and the main spindle motor 20 by increasing or decreasing the rotation speed of the guide bush servomotor 40 relative to the main spindle motor 20 without controlling the driving of the guide bush servomotor 40 so as to selectively switch the rotary guide bush 30 between the rotation state together with the main spindle 10 and the stop state.

CROSS-REFERENCE TO RELATED APPLICATION

The present application is based on and claims priority from Japanese Patent Application No. 2011-188563, filed on Aug. 31, 2011, the disclosure of which is hereby incorporated by reference in its entirety.

DESCRIPTION OF REFERENCE NUMERALS

10: Main Spindle
20: Main Spindle Motor (Main Spindle Driver)
30: Rotary Guide Bush (Eccentric Guide Bush)
32a: Hole (Portion eccentrically supporting workpiece)
40: Guide Bush Servomotor (Guide Bush Driver)
50: Controller (Controller, Phase Controller)
200: Workpiece (Object to be machined)
C1: Shaft Center
C2: Center
E: Length, Eccentric Amount

The invention claimed is:
1. A machine tool comprising:
a main spindle having a shaft center which fastens an object to be machined such that the shaft center is aligned with a center of the object to be machined, and rotates integrally with the object to be machined;
an eccentric guide bush which supports the object to be machined projecting from a leading end of the main spindle in a state of being eccentric relative to the shaft center of the main spindle, wherein the eccentric guide bush is switched between a rotation state rotating about the shaft center of the main spindle and a stop state;
a main spindle driver which rotates the main spindle about the shaft center;
a guide bush driver which rotates the eccentric guide bush about the shaft center; and
a controller configured to control the guide bush driver so as to switch the eccentric guide bush between the rotation state rotating about the shaft center in synchronization with the main spindle and the stop state.
2. The machine tool according to claim 1, wherein
the rotation of the eccentric guide bush and the rotation of the main spindle are adjusted, so as to change a phase of the object to be machined in a portion of the eccentric guide bush, which eccentrically supports the object to be machined.
3. The machine tool according to claim 2, further comprising:
a phase controller which controls at least one of the main spindle driver and the guide bush driver, so as to change the phase of the object to be machined in the portion of the eccentric guide bush, which eccentrically supports the object to be machined.

4. The machine tool according to claim 1, wherein
a corner portion adjacent to an inner circumferential surface supporting the object to be machined in an end face facing the main spindle in an end face of the eccentric guide bush is chamfered.

* * * * *